US009548534B2

(12) United States Patent
Calmettes et al.

(10) Patent No.: US 9,548,534 B2
(45) Date of Patent: Jan. 17, 2017

(54) METHOD FOR CALIBRATING AN ACTIVE ANTENNA

(71) Applicants: THALES, Neuilly-sur-Seine (FR); CENTRE NATIONAL D'ETUDES SPATIALES (CNES), Paris (FR)

(72) Inventors: Thibaud Calmettes, Toulouse (FR); Lionel Ries, Viviers les Montagnes (FR); Michel Monnerat, Saint Jean (FR)

(73) Assignees: Thales, Neuilly sur Seine (FR); Centre National D'Etudes Spatiales, Paris (FR)

( * ) Notice: Subject to any disclaimer, the term of this patent is extended or adjusted under 35 U.S.C. 154(b) by 774 days.

(21) Appl. No.: 13/659,691

(22) Filed: Oct. 24, 2012

(65) Prior Publication Data

US 2013/0106654 A1 May 2, 2013

(30) Foreign Application Priority Data

Oct. 26, 2011 (FR) ...................................... 11 03282

(51) Int. Cl.
*H01Q 3/26* (2006.01)
*G01S 19/23* (2010.01)
(52) U.S. Cl.
CPC ............... *H01Q 3/267* (2013.01); *G01S 19/23* (2013.01)
(58) Field of Classification Search
CPC ............................... G01S 19/23; G01S 19/235
USPC .... 342/165, 174, 357.62, 368; 701/467, 468
See application file for complete search history.

(56) References Cited

U.S. PATENT DOCUMENTS 5,796,760 A   8/1998   Wiedeman et al.
6,317,077 B1  11/2001  Solimani et al.

FOREIGN PATENT DOCUMENTS

EP    1033582 A1   9/2000
WO    01/48941 A2  7/2001

OTHER PUBLICATIONS

Andreas Lewandowski, et al., "Performance Evaluation of Satellite-Based Search and Rescue Services: Galileo vs. Cospas-Sarsat", 68th IEEE Vehicular Technology Conference, Sep. 21, 2008, pp. 1-5, IEEE, Piscataway, NJ, USA, XP031352252.
C. Fernandez Prades, et al., "Advanced Signal Processing Techniques in Local User Terminals for Search & Rescue Systems Based on MEO Satellites", ION GNSS 18th International Technical Meeting of the Satellite Division, Sep. 13-16, 2005, pp. 1349-1360, XP55004019.

*Primary Examiner* — Dao Phan
(74) *Attorney, Agent, or Firm* — Baker Hostetler LLP

(57) ABSTRACT

In the field of active phase-control antennas, a method is provided for calibrating the phase center of an active antenna including a plurality of sub-elements able to receive a useful signal emitted by a satellite, the calibration being defined as a function of the reception characteristics of a reference signal at the level of each sub-element, the reference signal being emitted by the same satellite on a frequency band substantially equal to the frequency band of the useful signal and whose theoretical reception characteristics are known.

7 Claims, 2 Drawing Sheets

METHOD FOR CALIBRATING AN ACTIVE ANTENNA

CROSS-REFERENCE TO RELATED APPLICATION

This application claims priority to foreign French patent application No. FR 1103282, filed on Oct. 26, 2011, the disclosure of which is incorporated by reference in its entirety.

FIELD OF THE INVENTION

The present invention relates to the field of active phase-control antennas. It relates more particularly to a method for calibrating the phase centre of an active phase-control antenna. The invention finds for example its utility in active terrestrial reception antennas for satellite communications.

BACKGROUND

Currently, terrestrial reception stations generally use an array of mobile parabolic antennas to track satellites. An example of such a reception station is represented in FIG. 1.

A problem with antennas of this type is that they are complex to implement. They also suffer from difficulties of speed of change of pointing, which can lead to performance degradations. Moreover, in reception stations, the number of antennas is very limited due to cost. Moreover the increase in gain in the antenna is accompanied by an increase in the dimension of the size of the antenna, and therefore an increase in complexity and cost.

It is known to use an active phase-control antenna to replace one or more mobile antennas. An active phase-control antenna is composed of a plurality of radiating sub-elements each having a phase shifting circuit. In such an antenna, the wave emitted or received by each of the sub-elements interferes with the wave of the others and a beam is produced through the sum of these constructive interferences. Moreover, by varying the phases and the amplitudes between each of the sub-elements, the beam may be steered towards a specific direction.

One of the difficulties related to the use of an active antenna, for example for tracking and communicating with satellites, is the control of the gain of its sub-elements and particularly in the frequency band in which they are used.

If for example, in a particular direction, a phase shift is created or a gain is deformed, the phase law which will be optimal for pointing in this particular direction will not be the same as if there had been no deformation. It should be noted that this deformation may vary over time.

It is known that the disturbing elements which may give rise to phase variations are elements of the order of a wavelength. Therefore, when the frequency band is low, for example a wavelength of the order of some twenty or so centimeters, a multitude of elements may disturb the operation of the antenna. Moreover, the antenna is also prone to the effects of ionospheric scintillation for example.

To use an active antenna in a precise manner it is therefore necessary to perform a calibration of the antenna, that is to say contrive matters so that the phase and amplitude law between the various sub-elements is truly optimal for beam formation so as to guarantee optimum antenna gain. This calibration may be performed definitively for example in the factory but the precision of beam formation will not be optimal. This calibration can also be performed permanently but this operation is fairly expensive.

The use of a single active antenna to replace several mobile antennas therefore generally suffers from the difficulties of calibration which lead either to an appreciable degradation of the gain if it is done poorly, or to the putting in place of complex and expensive calibration systems to obtain optimum gain. The use of active antennas for tracking constellations at wavelengths of greater than 30 cm is therefore limited at present.

SUMMARY OF THE INVENTION

An aim of the invention is notably to alleviate the aforementioned drawbacks by proposing a calibration method making it possible to improve the link performance between at least one satellite and an active phase-control terrestrial reception antenna.

For this purpose, the subject of the invention is a method for calibrating the phase centre of an active antenna comprising a plurality of sub-elements able to receive a useful signal emitted by a satellite, the said calibration being defined as a function of the reception characteristics of a reference signal at the level of each sub-element, the said reference signal being emitted by the same satellite on a frequency band substantially equal to the frequency band of the useful signal and whose theoretical reception characteristics are known.

According to one mode of implementation, the method comprises:
  a step of acquiring the values of the reference signal and those of the useful signal at the level of each of the sub-elements of the reception antenna,
  a step of measuring the possible discrepancy in phase and gain between the values of the actually received reference signal and the theoretical reception values of the reference signal,
  a step of evaluating the optimal distribution law to be applied to the values of the signals so as to take account of possible disturbances,
  a step of applying the possible new calculated distribution law to the sub-elements of the antenna.

According to a variant implementation of the method, the measuring step of the method is carried out by a correlation scheme.

According to a particular feature of this variant, the values of the reference signal are modified by varying these values in time and/or in frequency and/or in power so as to find the shape of the signal which has the best correlation with the reference signal actually received.

Advantageously, the various steps of the method are carried out in a sequential manner in real time.

According to another variant, the method comprises a step of storing for a predefined time interval the values of the reference signal and those of the useful signal measured at the level of each of the sub-elements of the reception antenna so as to perform the various steps of the method in a deferred manner.

According to the invention, the calibration method may be used to calibrate the phase centre of an active antenna for receiving MEOSAR signals, the reference signal being a GNSS signal and the useful signal a MEOSAR signal.

BRIEF DESCRIPTION OF THE DRAWINGS

Other particular features and advantages of the present invention will be more clearly apparent on reading the description hereinafter, given by way of nonlimiting illustration, and with reference to the appended drawings, in which.

DETAILED DESCRIPTION

The subject of the present invention is a method for calibrating the phase centre of an active terrestrial reception antenna comprising a plurality of radiating sub-elements and able to communicate with at least one satellite.

It is assumed that the satellite or satellites pointed at by the reception antenna emit, in addition to the useful signal, a signal serving as reference in a frequency band substantially equal to that of the useful signal and whose reception characteristics are known. The principle of the invention consists in using this reference signal to perform automatically and in a permanent manner the calibration of the phase centre of the active terrestrial reception antenna.

By way of wholly non-limiting example, the invention will be presented through the calibration of the phase centre of a phase-control active reception antenna of a terrestrial reception station of the MEOSAR (Medium Earth Orbit Search And Rescue) system, for which the downlink useful signal is emitted by location satellites (GPS, Galileo, Glonass) and at a frequency very close to the location signals.

Figure 1:
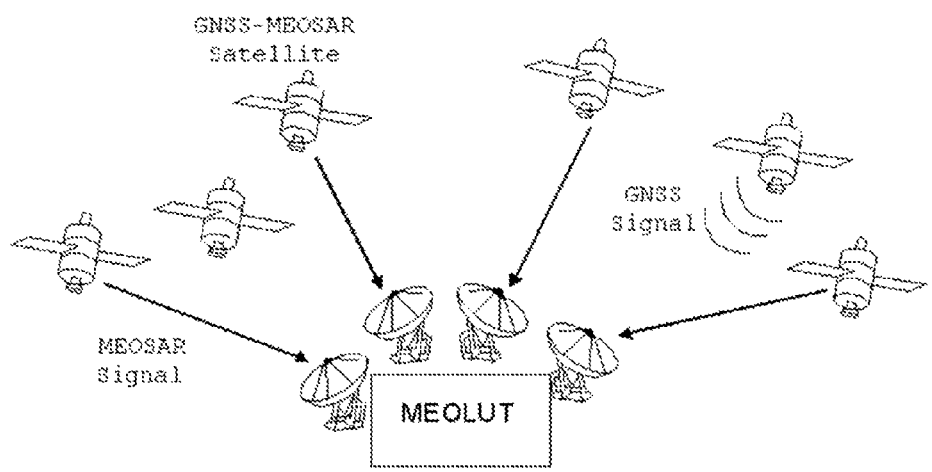
FIG. 1 represents an exemplary embodiment of a terrestrial reception station using mobile antennas.
Figure 2:
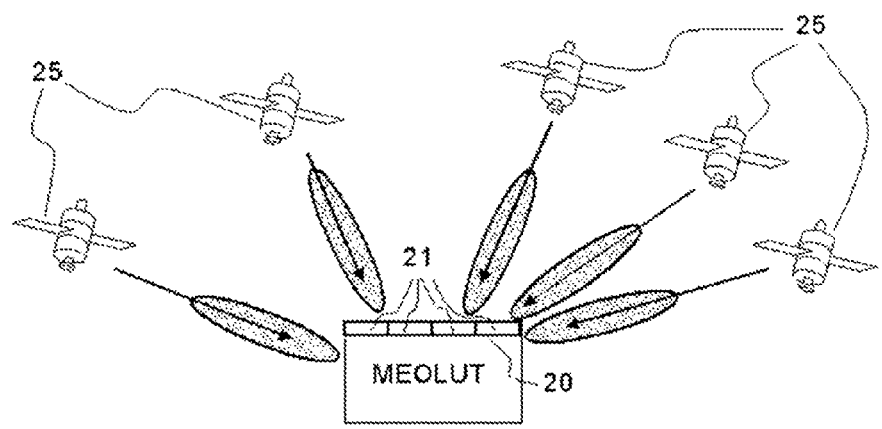
FIG. 2 represents an exemplary embodiment of a terrestrial reception station using a single active antenna.

FIG. 2 represents a ground processing centre (or MEOLUT for Medium Earth Orbit Local User Terminal) of the MEOSAR system in which the four mobile reception antennas of FIG. 1 have been replaced with a single phase-control active reception antenna 20. In an advantageous manner this single antenna makes it possible, as described previously, to point towards several satellites 25 simultaneously and thus to reduce the cost of the MEOLUT stations.

The MEOSAR system relies on various constellations of positioning satellites 25 (or GNSS for Global Navigation Satellite System), such as the American GPS (Global Positioning System), the Russian Glonass and the European Galileo system, for search and rescue operations (or SAR for "Search And Rescue"). In addition to their main location function, these positioning satellites 25 also have an SAR function and accordingly carry on board a transponder serving to relay the signals emitted by ground distress beacons. The downlink (or downgoing) frequency of this transponder is in the frequency band 1544 MHz~1545 MHz.

One of the operating frequencies of the positioning or GNSS satellites is 1576 MHz, therefore a frequency which is very close to the downlink frequency of the MEOSAR system.

The idea of the invention relies on the fact that the reception characteristics of the GNSS signals emitted by the positioning satellites 25 are known.

Indeed, the exact position of the GNSS satellites, the position of the reception antenna and the instants at which the signals are emitted by the satellites 25 are known with precision by virtue precisely of the principles of GNSS location. Therefore, the theoretical reception characteristics, at the level of the antennas of the MEOLUT, are also known. Moreover, the MEOSAR and GNSS signals are emitted in substantially equal frequency bands and are received from the same directions. These two signals will therefore undergo the same disturbances during their propagation between the positioning satellite 25 and the reception antenna 20. Thus, by comparing the characteristics of the GNSS signals actually received by each sub-element 21 of the active reception antenna 20 with the characteristics of the theoretical signals that they are supposed to receive, it is possible to calculate the corrections to be performed in order to take these disturbances into account. It is therefore possible to define an optimal amplitude and phase law, or distribution law, to be applied to each output of the sub-antennas 21 of the array so as to maximize the MEOSAR signal reception quality.

Figure 3:
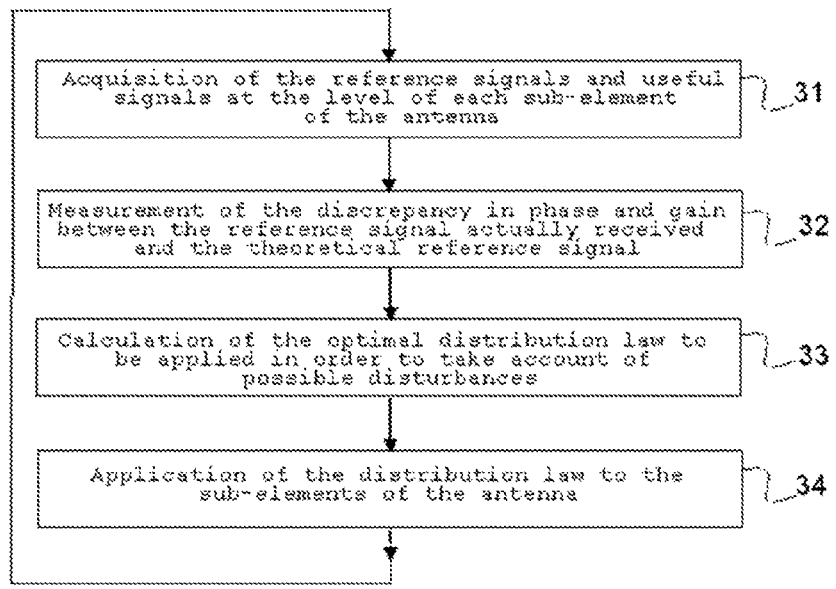
FIG. 3 represents an exemplary implementation of the calibration method in accordance with the invention.

With reference to FIG. 3, a mode of implementation of the calibration method in accordance with the invention is presented.

In a first mode of implementation of the method, the calibration is performed in a sequential manner in real time.

According to a first acquisition step 31, the values of the reference GNSS signal and the useful signals, namely the MEOSAR signals, are measured at the level of each sub-element 21 of the reception antenna 20.

The values of the GNSS signal are thereafter compared with the theoretical reception values of this signal. The theoretical reception values of the GNSS signal correspond to the values that the reception antenna would have received if no disturbance had deformed this signal in gain and/or in phase. These disturbances may be due to elements of lengths substantially equal to the wavelength of the signal, to problems related to multipaths, to the effects of ionospheric scintillation or to any other disturbing element.

In a known manner, the expected GNSS signal is evaluated according to the knowledge of the position of the reception antenna 20 and the position of the GNSS satellites 25, by a conventional GNSS positioning calculation.

If the GNSS signal actually received and the expected theoretical GNSS signal are identical, no disturbance has modified the signal during its propagation or no new disturbance has modified the propagation of the signal since the application of the previous distribution law. The antenna does not therefore require a new calibration.

If the two signals, theoretical and actually received, are different, a new calibration must be performed so as to take the disturbances into account. For this purpose, the error between the actually received GNSS reference signal and the theoretical GNSS signal is calculated in the course of a step 32 for each of the sub-elements of the active reception antenna.

According to a particular mode of implementation, this step 32 of measuring the error between the signal actually received by each sub-element 21 and the expected theoretical signal is carried out by a correlation scheme.

In certain modes of implementation of the method, the value of the reference GNSS signal is modified by varying the value of the signal in time and/or in frequency and/or in power so as to find the shape of the signal which has the best correlation with the actually received GNSS signal and therefore the shape of the signal which is closest to the signal actually received.

Once the optimal shift in time, frequency and/or power has been found, the correction to be made to the values received is known. An optimal distribution law to be applied to the values of the signals received at the level of each sub-element in order to take account of the disturbances can therefore be evaluated in the course of a step 33. The distribution law becomes that to be applied so as to maximize the gain in the desired direction. This same optimal distribution law is thereafter applied, in the course of a step 34, to the sub-elements 21 of the reception antenna 20. The application of this distribution law is equivalent to the application of a gain beam in a direction which maximizes the signal reception capacity. This direction is generally close to the "geometric" direction between the reception antenna 20 and the satellite 25 pointed at but may possibly be distinct depending on surrounding elements such as for example the couplings between sub-elements 21 of the antenna 20.

It is possible to verify a posteriori that the selected phase law does indeed correspond to that which maximizes the correlation with the expected signal by applying this distribution law to the sub-elements 21 of the reception antenna 20, by logging the GNSS signals and by comparing them with the theoretical signals. Optionally, in the case of differences between the two signals, the distribution law may be adjusted by small variations of phase and amplitude.

It should be noted that the distribution law calculation time is of the order of a second, therefore small with respect to the time of variation of the disturbances. Indeed, these disturbances, essentially atmospheric in kind or due to multipath problems with the emitted wave, have variations of the order of some ten seconds, therefore much slower variations than the second of the calculation time. Therefore, the distribution law applied with a delay of about a second will be almost optimal; it will not have evolved sufficiently over this timescale to pose any problem.

According to another exemplary implementation of the method, the processing of the data is not performed in real time but is performed a posteriori. For example, the values of the GNSS and MEOSAR signals received at the level of each sub-element 21 of the antenna 20 may be stored in a memory area of the antenna and/or of the terminal for processing the data during a determined acquisition period. Subsequently, the values of the GNSS signal received at the level of each sub-antenna and stored are compared with the theoretical reception values so as to define the differences between these two values and calculate the distribution law best representing the deformations in gain and in phase undergone by the signal emitted by the satellite during the acquisition period. As described previously, the step of measuring the differences between the signal actually received and the expected theoretical signal may be performed by a correlation scheme. The calculated distribution law is thereafter applied to the MEOSAR signal received at the level of each sub-element 21 during this same acquisition period.

Figure 4:
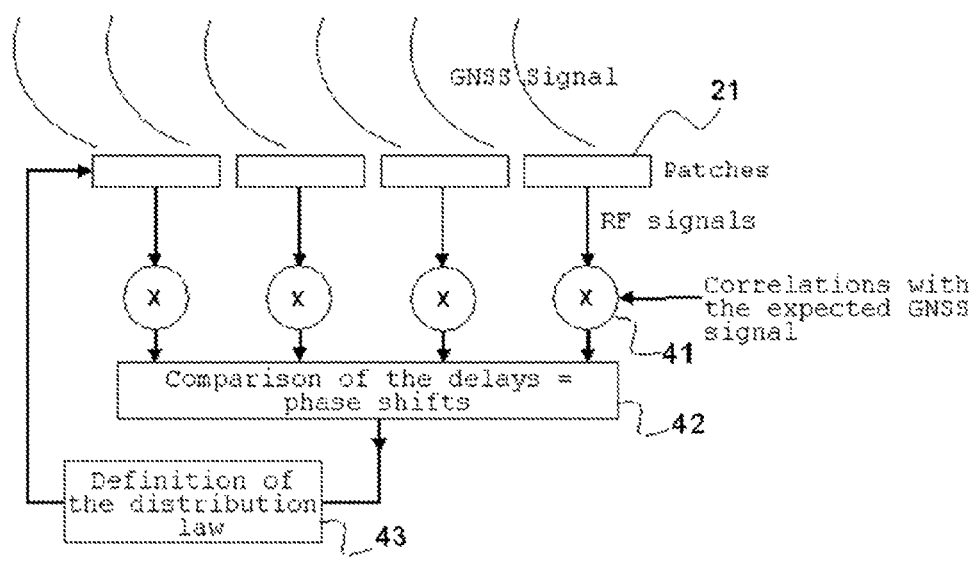
FIG. 4 represents an exemplary embodiment of a reception antenna in accordance with the invention.

FIG. 4 illustrates a wholly non-limiting exemplary embodiment of a reception antenna 20 autocalibrated according to the invention. In the example represented, the reception antenna 20 is a planar antenna (or "patch" antenna) possessing four sub-elements 21. Each sub-element 21 or reception emission module is linked to a correlator 41 so as to carry out the correlation with the expected theoretical GNSS reference signal. The signals arising from the correlators 41 are thereafter analysed by a comparison module 42. In this module, each time delay or advance is translated into a phase shift in the distribution law. Likewise, each amplitude difference is measured so as to define the compensation to be applied. After these calculations, an optimal distribution law making it possible to best translate these differences is calculated in a distribution law definition module 43. This distribution law is thereafter applied to the various sub-elements 21 of the antenna 20 for the reception of the useful signals, namely the MEOSAR signals in our example.

The invention has been described through an exemplary use of the calibration method according to the invention, however the invention is in no way limited to this example. Generally, this method can be applied to the calibration of the phase centre of any terrestrial reception antenna receiving signals from a satellite emitting, in addition to the useful signal, a reference signal in a frequency band substantially equal to that of the useful signal and that is able to serve for the calibration of the antenna.

The invention claimed is:

1. A method of calibration of a phase centre of an active antenna comprising a plurality of sub-elements able to receive a useful signal emitted by a satellite,
wherein said calibration is defined as a function of a reception gain and a reception phase of a reference signal at a level of each sub-element, the reference signal being emitted by a same satellite on a frequency band substantially equal to a frequency band of the useful signal, and whose theoretical reception phase and amplitude are known.

2. The method according to claim 1, further comprising:
acquiring values of the reference signal and those of the useful signal at the level of each of the sub-elements of a reception antenna,
measuring possible discrepancy in phase and gain between the values of an actually received reference signal and theoretical reception values of the reference signal,
evaluating an optimal distribution law to be applied to the values of the signals so as to take account of possible disturbances,
applying a possible new calculated distribution law to the sub-elements of the antenna.

3. The method according to claim 2, wherein the measuring step is carried out by a correlation scheme.

4. The method according to claim 3, wherein the values of the reference signal are modified by varying these values in time and/or in frequency and/or in power so as to find a shape of a signal which has the best correlation with the reference signal actually received.

5. The method according to claim 2, wherein the various steps of the method are carried out in a sequential manner in real time.

6. The method according to claim 2, further comprising a step of storing for a predefined time interval the values of the reference signal and those of the useful signal measured at the level of each of the sub-elements of the reception antenna so as to perform the steps of the method in a deferred manner.

7. Use of the method according to claim 1 for the calibration of the phase centre of an active antenna for receiving MEOSAR signals, wherein the reference signal is a GNSS signal and the useful signal is a MEOSAR signal.

* * * * *